(12) United States Patent
Finkelstein et al.

(10) Patent No.: US 8,868,591 B1
(45) Date of Patent: Oct. 21, 2014

(54) MODIFYING A USER QUERY TO IMPROVE THE RESULTS

(75) Inventors: Lev Finkelstein, Netanya (IL); Artiom Myaskouvskey, Haifa (IL); Shaul Markovitch, Haifa (IL); Tomer Shmiel, Ramat Gan (IL); Eran Ofek, Rehovot (IL); Isaac Elias, Haifa (IL)

(73) Assignee: Google Inc., Mountain View, CA (US)

( * ) Notice: Subject to any disclaimer, the term of this patent is extended or adjusted under 35 U.S.C. 154(b) by 170 days.

(21) Appl. No.: 13/239,236

(22) Filed: Sep. 21, 2011

Related U.S. Application Data (60) Provisional application No. 61/499,966, filed on Jun. 22, 2011.

(51) Int. Cl.
*G06F 17/30* (2006.01)

(52) U.S. Cl.
USPC .......................................................... 707/767

(58) Field of Classification Search
CPC .................. G06F 17/3064; G06F 17/30646
See application file for complete search history.

(56) References Cited

U.S. PATENT DOCUMENTS

| | | | |
|---|---|---|---|
| 6,671,681 B1 * | 12/2003 | Emens et al. ................. | 707/706 |
| 7,487,145 B1 | 2/2009 | Gibbs et al. | |
| 7,499,940 B1 | 3/2009 | Gibbs | |
| 7,707,201 B2 * | 4/2010 | Kapur et al. ................. | 707/706 |
| 7,756,855 B2 | 7/2010 | Ismalon | |
| 7,809,745 B2 * | 10/2010 | Elango et al. ................ | 707/765 |
| 7,836,044 B2 | 11/2010 | Kamvar et al. | |
| 7,996,488 B1 * | 8/2011 | Casabella et al. ............ | 709/217 |
| 8,224,689 B1 * | 7/2012 | Sandberg et al. ........... | 705/7.35 |
| 8,423,538 B1 * | 4/2013 | Sadikov et al. .............. | 707/722 |
| 2007/0250492 A1 * | 10/2007 | Angel et al. ...................... | 707/4 |
| 2007/0282811 A1 * | 12/2007 | Musgrove ........................ | 707/3 |
| 2008/0294609 A1 * | 11/2008 | Liu et al. ......................... | 707/3 |
| 2010/0094855 A1 * | 4/2010 | Rouhani-Kalleh ........... | 707/706 |
| 2010/0106706 A1 * | 4/2010 | Rorex et al. .................. | 707/709 |
| 2010/0268712 A1 * | 10/2010 | Ngwije ........................ | 707/737 |
| 2011/0289063 A1 * | 11/2011 | Radlinski et al. ............ | 707/706 |
| 2011/0295824 A1 * | 12/2011 | Schneider .................... | 707/706 |
| 2012/0233140 A1 * | 9/2012 | Collins-Thompson et al. ............................ | 707/706 |

FOREIGN PATENT DOCUMENTS

WO        2006055120        7/2006

* cited by examiner

*Primary Examiner* — Kevin L Young
(74) *Attorney, Agent, or Firm* — Middleton Reutlinger (57) ABSTRACT

The present invention relates to the identification of alternative suggestions which potentially improve on a given query suggestion, without being perceived by a user as being offensively different from the user's query. The alternative suggestions may for example be different query formulations that relate to the same topic as that of the given query suggestion. The technology disclosed uses similarity screening of the given query suggestion against unique queries which do not include the given query suggestion as a prefix, in conjunction with query utility scores representing prior user response to the unique queries.

24 Claims, 9 Drawing Sheets

Examples of Canonicalizations

| Query | Canonical Form |
|---|---|
| [how to find a recipe for pizza] | [find pizza recipe] |
| [what is the dollar worth] | [dollar worth] |
| [best pizza dough recipe] | [dough pizza recipe] |
| [recipe for pizza dough] | [dough pizza recipe] |
| [pictures of dogs] | [dog pictures] |
| [best dog picture] | [dog pictures] |
| ... | ... |

Example Diagrams of Variant Mapping

MODIFYING A USER QUERY TO IMPROVE THE RESULTS

CROSS-REFERENCE TO RELATED APPLICATIONS

This application claims the benefit of U.S. Provisional Application No. 61/499, 966, entitled "Modifying a User Query to Improve Results" filed 22 Jun. 2011, which is incorporated by reference herein.

BACKGROUND OF THE INVENTION

The present invention relates to query formulation. In particular, it relates to identifying variants of search queries which potentially improve search results.

Information retrieval systems, such as Internet search engines, are responsive to a user's query to retrieve information about accessible resources such as Web pages, images, text documents and multimedia content. A search engine may use a variety of statistical measures to determine the relevance of the resources to the user's query.

For a variety reasons, a user can have difficulty formulating a query that accurately represents the user's information need. For example, a user unfamiliar with the language of the resources being searched may use unconventional query terms. As another example, users may use terms which are too specific or general to yield high quality search results. As a result, the search engine may return a number of resources which are unrelated to the informational need of the user. In such a case, the user may have to enter a number of different queries about the same topic before reaching resources that are of interest to the user. The user's queries may include variations in the query terms, variations in the number of terms, and variations in the order of the terms. Refining the search can be a time-consuming and frustrating experience for the user.

To assist the user in formulating an efficient search, a search engine may suggest queries to the user. Some search engines provide suggested queries to the user as the user is typing the query. The search engines typically provide suggested queries which contain the user's query, essentially completing the query by typing ahead for the user.

It is desirable to provide improved techniques for identifying suggested queries that are likely to provide meaningful search results to the user conducting the search.

SUMMARY OF THE INVENTION

In one implementation, a method is described for selecting at least one variant of a given query suggestion. The method includes calculating similarity scores between a given query suggestion and unique queries that do not include the given query suggestion as a prefix. The similarity score for a unique query is based at least in part on similarity of terms in the given query suggestion and terms in the unique query. The unique queries are past queries submitted to one or more search engines. The method further includes selecting one or more of the unique queries as candidate variants of the given query suggestion based at least in part on the similarity scores for the unique queries. The method further includes selecting one or more of the candidate variants as selected variants of the given query suggestion using query utility scores for the candidate variants. A query utility score for a candidate variant is based on user response to the candidate variant during one or more prior queries. The method further includes storing data associating the given query suggestion with the selected variants for use in determining an alternative suggestion for the given query suggestion from among the selected variants.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Particular embodiments of the subject matter described herein can be implemented for identifying alternative suggestions which potentially improve on a given query suggestion, without being perceived by a user as being offensive different from the user's query. The alternative suggestions may for example be different query formulations that relate to the same topic as that of the given query suggestion.

These and other embodiments of the subject matter described herein can each optionally include one or more of the following features.

Selecting the one or more of the candidate variants as selected variants can include selecting candidate variants having query utility scores greater than that of the given query suggestion.

Calculating the similarity scores for the unique queries can include canonicalizing the given query suggestion and the unique queries into respective canonical representations using canonicalization rules. The canonical representation of the given query suggestion can then be compared against that of the unique queries to produce the similarity scores. The selection of one or more of the unique queries as candidate variants can include selecting unique queries which have canonical representations identical to that of the given query suggestion.

Selecting the one or more of the candidate variants as selected variants can include sorting the candidate variants using the query utility scores to create a ranking. One or more unique queries can then be selected as selected variants based at least in part on the ranking. The method can be extended by selecting a predetermined number of highest ranked candidate variants as a selected variant. The method can be further extended by the predetermined number being one.

Selecting the one or more of the unique queries as candidate variants can include selecting unique queries having similarity scores above a threshold.

The method can further include receiving the given query suggestion. One or more of the selected variants can then be sent in response to receiving the given query suggestion.

The method can further include where the unique queries further do not include the given query suggestion as a substring.

Particular aspects of one or more embodiments of the subject matter described in this specification are set forth in the drawings and the description below. Other features, aspects, and advantages of the subject matter will become apparent from the description, the drawings, and the claims.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations of the description that follows.

The present invention relates to the identification of alternative suggestions which potentially improve on a given query suggestion, without being perceived by a user as being offensively different from the user's query. The given query suggestion is a suggestion for a user's query that may be identified using conventional of other techniques. The alternative suggestions may for example be different query formulations that relate to the same topic as that of the given query suggestion. The technology disclosed uses similarity screening of the given query suggestion against unique queries which do not include the given query suggestion as a prefix, in conjunction with query utility scores based on prior user response to the unique queries.

At least one variant to suggest as an alternative suggestion to a subsequent computerized process, responsive to a given query suggestion, is selected. Selected variants for the given query suggestion will typically be pre-calculated and stored for use by one or more subsequent processes. The technology includes processing the given query suggestion against unique queries that do not include the given query suggestion as a prefix, or some other criteria. A prefix is a sequence of one or more terms occurring at a beginning of a query. A unique query includes the given query suggestion as a prefix if the unique query begins with a sequence that includes all the terms in the given query suggestion, in the same order as the term occur in the given query suggestion.

In some implementations, the unique queries further do not include the given query suggestion as a substring. Query A is a 'substring' in query B if query B includes all the terms of query A in the same order as the terms occur in query A, with no additional terms between them. For example, query "best pizza dough" is a substring in query "the best pizza dough recipe". (Extraneous blanks are ignored.) In contrast, query "recipe pizza dough" is not a substring in query "the best pizza dough recipe".

Similarity scores are calculated for the unique queries based at least in part on similarity of terms in the given query suggestion and in the unique queries. In some implementations the given query suggestion and the unique queries are canonicalized into respective canonical representations using canonicalization rules. Examples of canonicalization rules are given below. The canonical representation of the given query suggestion can then be compared against that of the unique queries to produce the similarity scores. Alternatively, other techniques may be used to produce the similarity scores.

Candidate variants are selected from among the unique queries based, at least in part, on the similarity scores.

Attention to perceived similarity of suggested queries to the user's query produces suggestions that may not contain the user's query but still are safe from being perceived as significantly different from the user's query. Using similarity scores reduces the likelihood of making suggestions that the user perceives as unrelated to the desired information. Suggested queries that are perceived as unrelated to the user's query can frustrate the user and result in a poor user experience.

Selected variants for the given query suggestion are then selected from the candidate variants using query utility scores or some other criteria. The query utility scores are based on user response to the candidate variants during prior queries. The query utility scores may for example be based on the frequency of the queries in the log files. Data associating the selected variants with the given query suggestion are then stored for use by a subsequent computerized process in determining an alternative suggestion for the given query suggestion.

Figure 1:
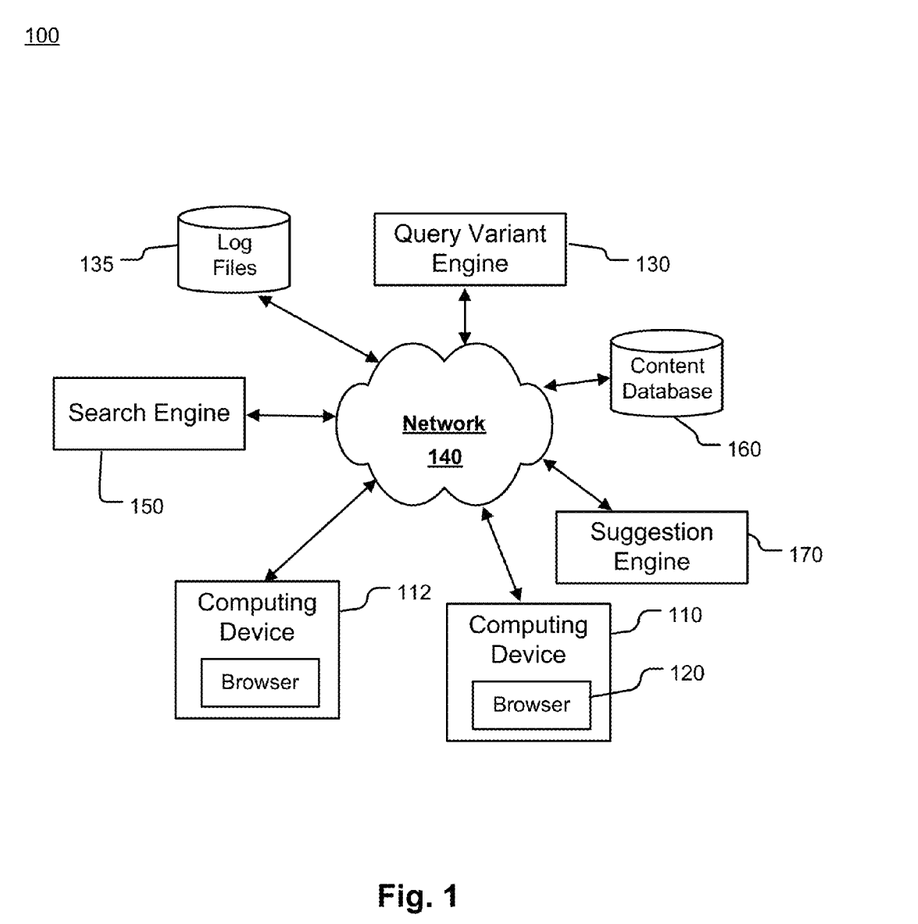
FIG. 1 illustrates a block diagram of an example environment in which selecting variants for a given query suggestion can be used.

FIG. 1 illustrates a block diagram of an example environment 100 in which selecting variants for a given query suggestion can be used. The environment 100 includes client computing devices 110, 112 and a search engine 150. The environment 100 also includes a communication network 140 that allows for communication between various components of the environment 100.

During operation, users interact with the search engine 150 through the client computing devices 110, 112. The client computing devices 110, 112 and the search engine 150 each include memory for storage of data and software applications, a processor for accessing data and executing applications, and components that facilitate communication over the communication network 140. The computing devices 110, 112 execute applications, such as web browsers (e.g. web browser 120 executing on computing device 110), that allow users to formulate queries and submit them to the search engine 150. The search engine 150 receives queries from the computing devices 110, 112, and executes the queries against a content database 160 of available resources such as Web pages, images, text documents and multimedia content. The search engine 150 identifies content which matches the queries, and responds to the queries by generating search results which are transmitted to the computing devices 110, 112 in a form that can be presented to the users. For example, in response to a query from the computing device 110, the search engine 150 may transmit a search results web page to be displayed in the web browser 120 executing on the computing device 110.

The search engine 150 maintains log files 135 of user session query data associated with the past queries received from users. It may maintain an anonymous log of queries, not traceable to a particular user, or it may maintain a user specific log for the user's future reference, at the user's request. The log files 135 may be collectively stored on one or more computers and/or storage devices. The log files 135 may include information such as which results were selected by users after a search was performed on a particular query, and how long each selected result was viewed by a user. Past queries that do not appear more than a threshold number of times may be filtered out. Alternatively, queries may be obtained using other techniques.

The log files 135 are used by a suggestion engine 170 to generate query utility scores of the past queries. The suggestion engine 170 includes memory for storage of data and software applications, a processor for accessing data and executing applications, and components that facilitate communication over the communication network 140. The calculation of query utility scores is not part of the technology disclosed. The technology disclosed supposes that query utility scores will be available for the unique queries that are evaluated. The query utility scores may for example be based on the frequency of the queries in the log files 135. The query utility scores are based on user responses to the past queries based on the user behavior, to estimate user satisfaction with the past queries. The query utility scores are thus a measure of the search result quality of the associated queries stored in the log files 135. The expected improvement in search quality of one query over another can then be determined by comparing their respective query utility scores.

The environment 100 also includes a query variant engine 130 that processes the queries in the log files 135 to identify variants which potentially improve on a given query suggestion using the techniques described herein. The query variant engine 130 can be implemented in hardware, firmware, and/or software running on hardware. The query variant engine 130 is described in more detail below and with reference to FIGS. 3 to 8A-8B.

In response to a user's query, the search engine 150 may forward the user's query to the suggestion engine 170. In response to the user's query, the suggestion engine 170 provides one or more query suggestions for the user's query to the query variant engine 130. The suggestion engine 170 may use conventional of other techniques to identify query suggestions for the user's query. These query suggestions may be past queries submitted by prior users and that include the user's query. The query suggestions may be based on popularity. In one implementation, popularity is based on frequency with which prior users submitted the query suggestions as search queries. The suggestion engine 170 may also use other factors to select query suggestions.

In response to the query suggestions, the query variant engine 130 provides selected variants of the query suggestions to the suggestion engine 170 using the techniques described herein. The selected variants represent suggestions that the suggestion engine 170 may provide to users as alternatives to the identified query suggestions. One or more of the selected variants can then be chosen by the suggestion engine 170 and provided as final suggestions to a user. These final suggested query variants represent queries that the users of the computing devices 110, 112 may want to submit in addition to, or instead of, the query actually typed or submitted.

The network 140 facilitates communication between the various components in the environment 100. The network 140 may utilize a combination of dedicated or private communications links and public communication links. In one embodiment, the network 140 uses standard communications technologies, protocols, and/or inter-process communications techniques.

Many other configurations the environment 100 are possible having more or less components than the environment 100 shown in FIG. 1. For example, the environment 100 can include multiple search engines. The environment 100 will also generally include many more computing devices that submit queries to the search engines.

Figure 2:
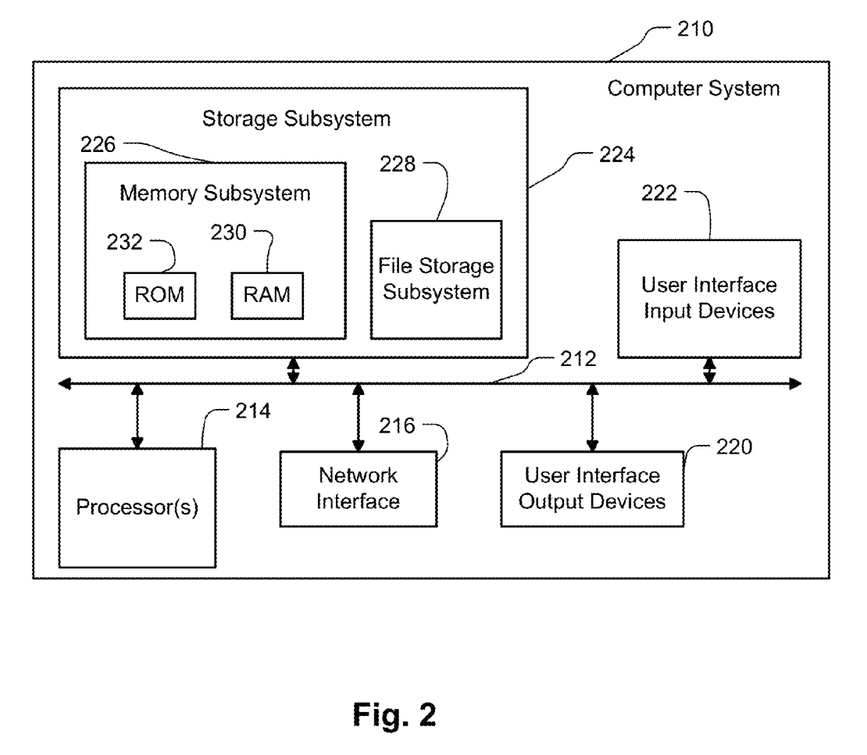
FIG. 2 is a block diagram of an example computer system.

FIG. 2 is a block diagram of an example computer system. Computer system 210 typically includes at least one processor 214 which communicates with a number of peripheral devices via bus subsystem 212. These peripheral devices may include a storage subsystem 224, comprising for example memory devices and a file storage subsystem, user interface input devices 222, user interface output devices 220, and a network interface subsystem 216. The input and output devices allow user interaction with computer system 210.

Network interface subsystem 216 provides an interface to outside networks, including an interface to communication network 140, and is coupled via communication network 218 to corresponding interface devices in other computer systems. Communication network 218 may comprise many interconnected computer systems and communication links. These communication links may be wireline links, optical links, wireless links, or any other mechanisms for communication of information. While in one embodiment, communication network 218 is the Internet, in other embodiments, communication network 218 may be any suitable computer network.

User interface input devices 222 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include possible types of devices and ways to input information into computer system 210 or onto communication network 218.

User interface output devices 220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 210 to the user or to another machine or computer system.

Storage subsystem 224 stores programming and data constructs that provide the functionality of some or all of the modules described herein, including the logic to select suggested variants for a given query suggestion according to the processes described herein. These software modules are generally executed by processor 214 alone or in combination with other processors.

Memory 226 used in the storage subsystem can include a number of memories including a main random access memory (RAM) 232 for storage of instructions and data during program execution and a read only memory (ROM) 230 in which fixed instructions are stored. A file storage subsystem 228 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem in the storage subsystem 224, or in other machines accessible by the processor.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Computer system 210 can be of varying types including a workstation, server, computing cluster, blade server, server farm, or any other data processing system or computing device. Due to the ever-changing nature of computers and networks, the description of computer system 210 depicted in FIG. 2 is intended only as a specific example for purposes of illustrating the preferred embodiments. Many other configurations of computer system 210 are possible having more or less components than the computer system depicted in FIG. 2.

Figure 3:
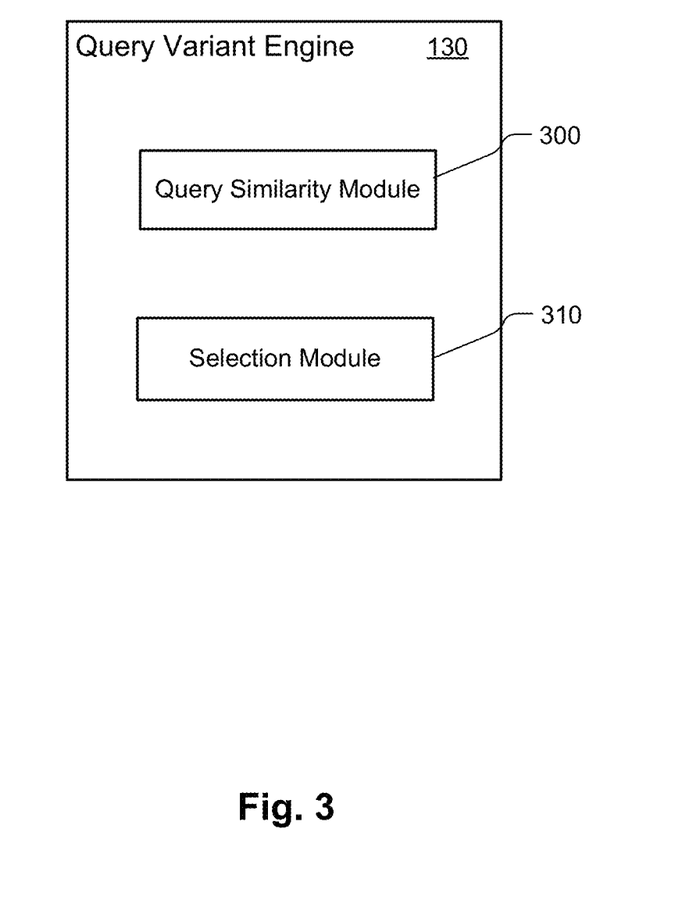
FIG. 3 is a block diagram illustrating example modules within the query variant engine in accordance with one embodiment.

FIG. 3 is a block diagram illustrating example modules within the query variant engine 130 in accordance with one embodiment. In FIG. 3, the query variant engine 130 includes a query similarity module 300 and a selection module 310. Some embodiments may have different and/or additional modules than those shown in FIG. 3. Moreover, the functionalities can be distributed among the modules in a different manner than described herein.

The query similarity module 300 retrieves unique queries by processing the past queries stored in the log files 135. Alternatively, unique queries can be obtained using other techniques.

The query similarity module 300 also retrieves a given query suggestion. The given query suggestion may be retrieved by processing a suggestion log of past suggestions provided to prior users by the suggestion engine 170. The suggestion log may be maintained by the suggestion engine 170. The suggestion log can include suggestion session information including the past suggestions that were provided to prior users in response to a corresponding user query.

Alternatively, other techniques may be used by the query similarity module 300 to retrieve or otherwise obtain a given query suggestion. For example, the query similarity module 300 may retrieve the given query suggestion by processing the past queries stored in the log files 135.

The query similarity module 300 then processes a given query suggestion against unique queries that do not include the given query suggestion as a prefix to calculate similarity scores for the unique queries. Similarity scores are calculated for the unique queries based at least in part on similarity of terms in the given query suggestion and terms in the unique queries.

The techniques for determining the similarity score and the range of values can vary from embodiment to embodiment. For example, in one embodiment, the similarity score for a particular unique query may be low if the given query suggestion is a question and the particular unique query is not a question. The similarity score may be low if terms in the particular unique query have opposite meaning to terms in the given query suggestion. For example, "flight to" has the opposite meaning of "flight from". The similarity score may be low if the particular unique query contains a singular form of a word, and the given query suggestion contains a plural form of the same word. The similarity score may be low if the particular unique query and the given query suggestion belong to different languages. In some embodiments, two or more similarity scores may be generated using different similarity criteria. The final similarity score may for example be a weighted average of these two or more similarity scores.

The selection module 310 selects one or more of the unique queries as candidate variants for the given query suggestion based at least in part on the similarity scores for the unique queries. The number of unique queries that are selected as candidate variants for the given query suggestion can vary from embodiment to embodiment.

In one embodiment, a set of unique queries having similarity scores above a threshold are identified. The unique queries selected as candidate variants may for example include all the unique queries in the set. Alternatively, additional criteria may be applied to the set of unique queries to select the final candidate variants. If none of the unique queries have a similarity score above the threshold, the selection module 310 may flag the given query suggestion as not having a candidate variant.

The selection module 310 then selects one or more of the candidate variants as selected variants for the given query suggestion using the query utility scores for the candidate variants. The criteria for selecting the selected variants can vary from embodiment to embodiment. In one embodiment, the candidate variants are sorted using the query utility scores to create a ranking, and the one or more of the selected variants are selected based on the ranking. Alternatively, other criteria may be used. For example, the query utility scores of the candidate variants may be compared to a threshold and the ones that satisfy the threshold may be selected.

The number of candidate variants selected as selected variants can vary from embodiment to embodiment. In one embodiment, only the highest ranked candidate variant is selected as a selected variant. Alternatively, the number of highest ranked candidate variants that are selected may be a predetermined number that is greater than one. For example, the two or three highest ranked candidate variants may be selected. If none of the candidate variants have a query utility score greater than that of the given query suggestion, the selection module 310 may flag the given query suggestion as not having a selected variant. In one embodiment, if the query utility score of the given query suggestion is above a threshold, the selection module 310 may flag the given query suggestion as not having a selected variant.

The selection module 310 then stores data associating the given query suggestion with the selected variants for use in determining an alternative suggestion for the given query suggestion from among the selected variants.

Figure 4:
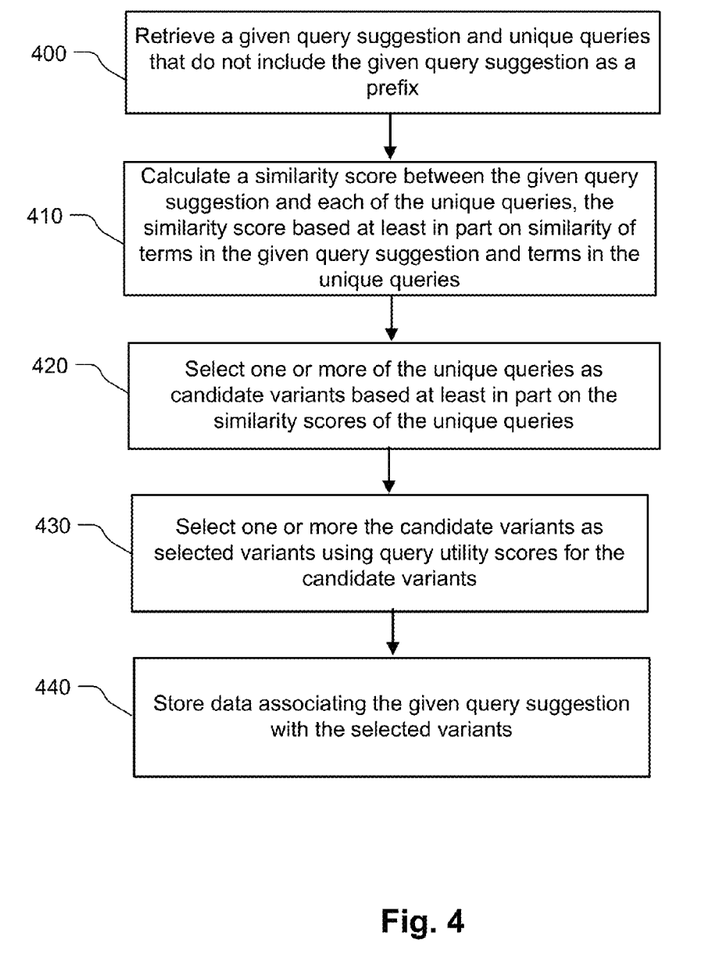
FIG. 4 is a flow chart illustrating an example process for selecting variants of a given query suggestion.

FIG. 4 is a flow chart illustrating an example process for selecting variants of a given query suggestion. Other embodiments may perform the steps in different orders and/or perform different or additional steps than the ones illustrated in FIG. 4. For convenience, FIG. 4 will be described with reference to a system of one or more computers that performs the process. The system can be, for example, the query variant engine 130 described above with reference to FIG. 1.

At step 400, the system retrieves a given query suggestion. The system also retrieves unique queries that do not include the given query suggestion as a prefix from the log files 135 or using other techniques.

At step 410, the system calculates a similarity score between the given query suggestion and each of the unique queries. The similarity score for a unique query is based at least in part on similarity of terms in the given query suggestion and terms in the unique query. The similarity scores and the range of values can be calculated using the techniques described above.

At step 420, the system selects one or more of the unique queries as the candidate variants based at least in part on the similarity scores for the unique queries, for example, as described above with reference to FIG. 3. At step 430, the system then selects one or more of the candidate variants as selected variants using the query utility scores for the candidate variants, for example, as described above with reference to FIG. 3. At step 440, the system stores data associating the given query suggestion with the selected variants for use in determining an alternative suggestion for the given query suggestion.

The steps 400, 410, 420, 430, 440 can then be repeated until selected variants, if any, for the remaining query suggestions have been selected.

Figure 5:
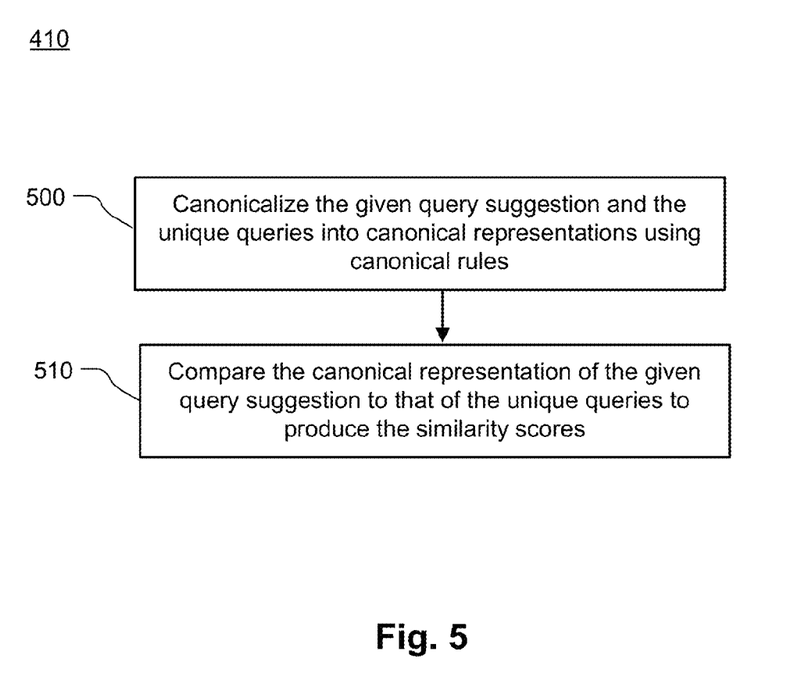
FIG. 5 is a flow chart illustrating an example process for producing similarity scores.

FIG. 5 is a flow chart illustrating an example process for producing similarity scores in step 410. Other embodiments may perform the steps in different orders and/or perform different or additional steps than the ones illustrated in FIG. 5. For convenience, FIG. 5 will be described with reference to a system of one or more computers that performs the process. The system can be for example, the query variant engine 130 described above with reference to FIG. 1.

In step 500, the system canonicalizes the given query suggestion and the unique queries into canonical representations using canonicalization rules. The canonicalization rules can vary from embodiment to embodiment. Examples of canonicalization rules include stemming, stopword removal, word reordering, and removing duplicate terms. Canonicalization includes the process of converting the terms in a query into a standard form by replacing the terms with their canonical forms when the terms meet certain canonicalization rules. Canonicalization also includes alphabetical reordering of the canonical forms of the terms and removal of identical terms. With canonicalization, different queries that represent the same or similar user informational intent can be matched, so that suggested query variants can be selected which most likely capture the user's information need.

In step 510, the system compares the canonical representation of the given query suggestion to that of the unique queries to produce the similarity scores. In one embodiment, the similarity score of a particular unique query is assigned the highest value (e.g. '1') if there is an exact match between its canonical form and that of the given query suggestion. Otherwise, the similarity score is assigned the lowest value (e.g. '0'). In such an approach, the unique queries which will be subsequently selected as candidate variants will have canonical representations identical to that of the given query suggestion. In alternative embodiments, the similarity scores may have a value between a range, rather than a discrete value.

Figure 6:
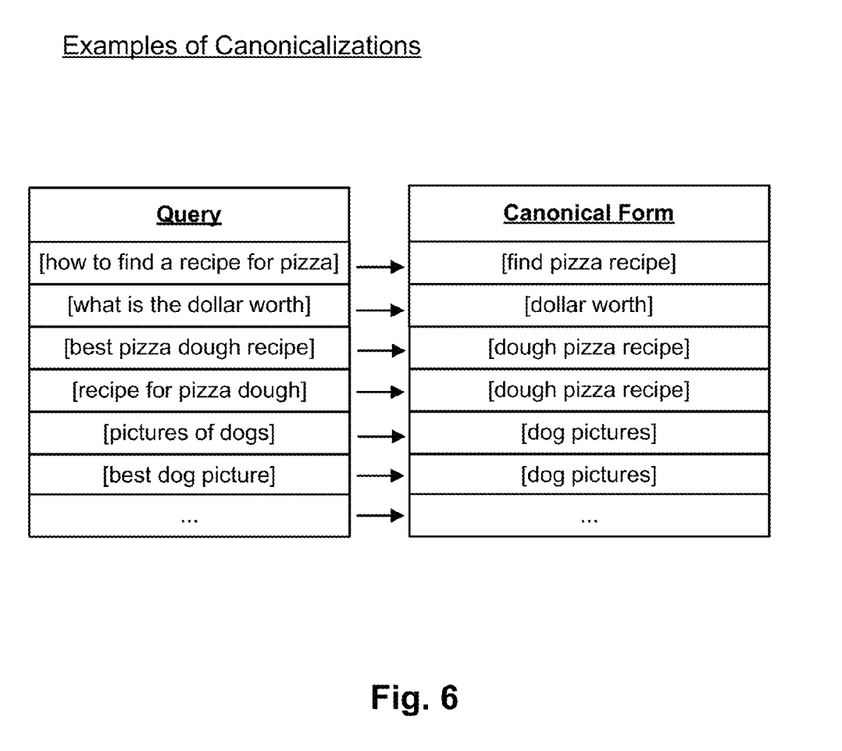
FIG. 6 illustrates examples of queries and their canonical forms.

FIG. 6 illustrates examples of queries and their canonical forms. In this example, the queries are converted into canonical form through the removal of stopwords such as "how" and "best", stemming, removal of duplicate terms, and the alphabetical reordering of remaining terms.

Figure 7:
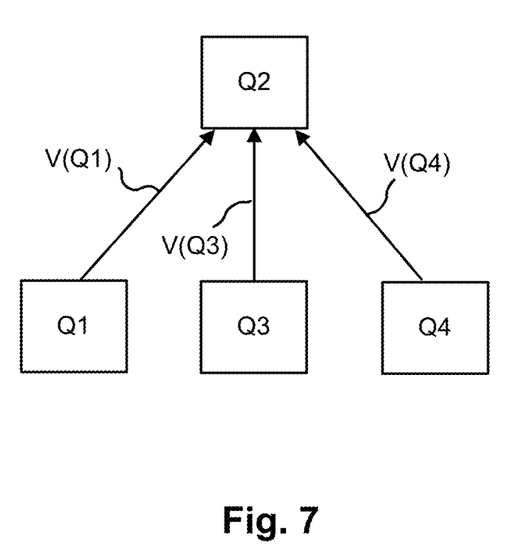
FIG. 7 illustrates an example of the mapping between queries and suggested query variants.

FIG. 7 illustrates an example of the mapping between query suggestions and selected variants. In this example, query Q2 is a selected variant, V, for each of the query suggestions Q1, Q3 and Q4.

Figure 8A:
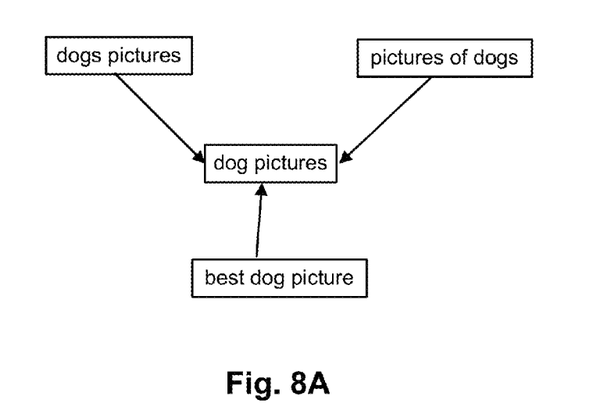
FIGS. 8A and 8B illustrate examples of the mapping between query suggestions and selected variants.
Figure 8B:
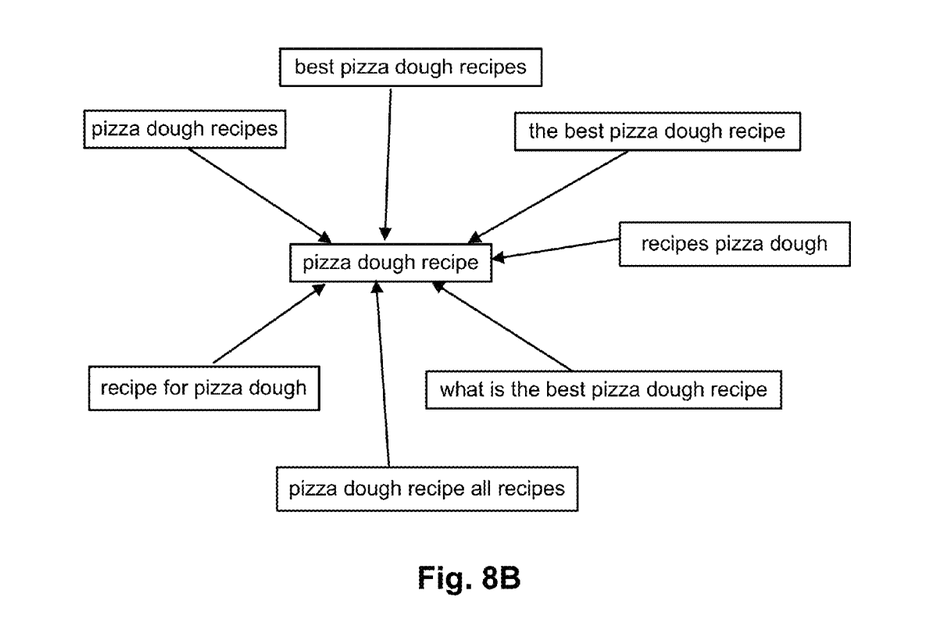

FIGS. 8A and 8B illustrate examples of the mapping between query suggestions and selected variants. In FIG. 8A, the query suggestion "dog pictures" is a selected variant of each of the queries "dogs pictures", "pictures of dogs" and "best dog picture". In FIG. 8B, the query suggestion "pizza dough recipe" is a selected variant of each of the query suggestions shown in the figure.

As described above, data associating the selected variants with the given query suggestion is stored by the query variant engine 130 for use by a subsequent computerized process that determines an alternative suggestion for the given query suggestion from among the selected variants.

For example, in response to a user's query, the suggestion engine 170 can then operate in conjunction with the query variant engine 130 to make final suggestions to the user. These final suggestions represent queries that the users of the computing devices 110, 112 may want to submit in addition to, or instead of, the queries actually typed and/or submitted.

In some embodiments, the query variant engine 130 may use additional criteria to determine whether to provide the selected variants at all, and if so, how prominently the selected variants should be placed in comparison to the given query suggestion which may contain the user's query. These additional criteria may include for example, whether the user's query, the given query suggestion and the selected variants have the same prefix. Other criteria may include whether the given query suggestion and the selected variants are equivalent under weaker canonicalization rules, or if a circular shift of size one for the selected variants results in the given query suggestion. These weaker canonicalization rules may include for example punctuation, stemming, url removal and stops words removal. Other criteria may include whether the given query suggestion and the selected variants share at least half of their search results. Other criteria may include whether the term in the selected variants that corresponds to the last term in the given query suggestion is a stop word.

Figure 9A:
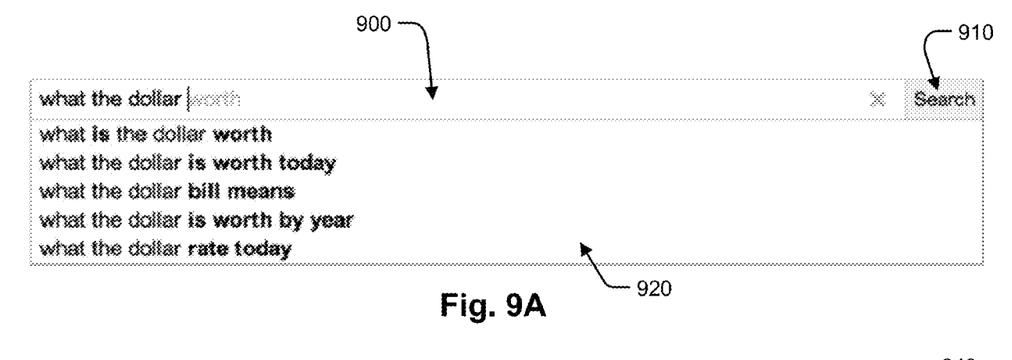
FIGS. 9A and 9B are screen shots illustrating example environments that can be used to provide suggestions to a user.
Figure 9B:
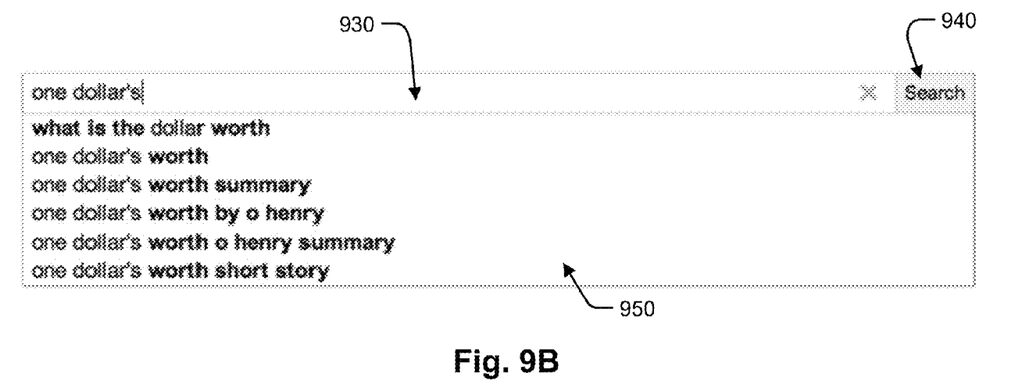

The final suggestions may for example be embedded by the search engine 150 within a search results web page to be displayed in the web browser 120 executing on the computing device 110. As another example, the final suggestions may be displayed within a cascaded drop menu of the search field of an application, such as a web browser, as the user is typing a query. FIGS. 9A and 9B are screen shots illustrating example environments that can be used to provide suggestions to a user.

In FIG. 9A, the partial screen shot includes a search field representation 900 and a search button representation 910. In this example, when the user enters the query "what the dollar" into the search field representation 900, a cascaded drop menu 920 of the search field is displayed which includes selected variants which potentially improve on past query suggestions for the user's query. As shown in FIG. 9A, the cascaded drop down menu 920 includes final suggestion "what is the dollar worth" is a selected variant, which does not include the user's query "what the dollar" as a prefix.

In FIG. 9B, the partial screen shot includes a search field representation 930 and a search button representation 940. In this example, when the user enters the query "one dollar's" into the search field representation 930, a cascaded drop menu 950 of the search field is displayed which includes selected variants which potentially improve on the past query suggestions for user's query. As shown in FIG. 9B, the cascaded drop down menu 950 includes final suggestion "what is the dollar worth" is a selected variant, which does not include the user's query "one dollar's" as a prefix.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for selecting variants for a given query suggestion, systems including logic and resources to select variants for a given query suggestion, systems that take advantage of computer-assisted methods for selecting variants for a given query suggestion, media impressed with logic to select variants for a given query suggestion, data streams impressed with logic to select variants for a given query suggestion, or computer-accessible services that carry out computer-assisted methods for selecting variants for a given query suggestion. It is contemplated that modifications and combinations will readily occur to those skilled in the art, which modifications and combinations will be within the spirit of the invention and the scope of the following claims.

We claim as follows:

1. A method of selecting at least one variant of a given query suggestion, including:
   determining, using canonicalization rules, canonical representations of the given query suggestion and unique queries that do not include the given query suggestion as a prefix, wherein the unique queries are existing queries submitted to one or more search engines in the past;
   comparing the canonical representation of the given query suggestion to the canonical representations of the unique queries to produce similarity scores between the given query suggestion and the unique queries, the similarity scores based on similarity between the canonical representation of the given query suggestion and the canonical representations of the unique queries;

selecting one or more of the unique queries having similarity scores that satisfy a threshold as candidate variants of the given query suggestion, wherein selecting the one or more of the unique queries as candidate variants includes selecting at least one unique query which has a canonical representation identical to that of the given query suggestion;

selecting one or more of the candidate variants as selected variants of the given query suggestion using query utility scores for the candidate variants, wherein a query utility score for a candidate variant is based on user response to the candidate variant during one or more prior queries; and storing data associating the given query suggestion with the selected variants for use in determining an alternative suggestion for the given query suggestion from among the selected variants.

2. The method of claim 1, wherein selecting the one or more of the candidate variants as selected variants includes selecting candidate variants having query utility scores greater than that of the given query suggestion.

3. The method of claim 1, wherein selecting the one or more of the candidate variants as selected variants includes:
sorting the candidate variants using the query utility scores to create a ranking; and
selecting the one or more unique queries as selected variants based at least in part on the ranking.

4. The method of claim 3, wherein selecting the one or more of the candidate variants as selected variants based at least in part on the ranking includes selecting a predetermined number of highest ranked candidate variants as a selected variant.

5. The method of claim 4, wherein the predetermined number is one.

6. The method of claim 1, wherein producing the similarity scores includes calculating two or more similarity scores between the given query suggestion and each of the unique queries, and selecting the one or more of the unique queries as candidate variants includes selecting a particular unique query based on a combination of the two or more similarity scores calculated between that particular unique query and the given query suggestion.

7. The method of claim 1, including:
receiving the given query suggestion; and
sending one or more of the selected variants in response to receiving the given query suggestion.

8. The method of claim 1, wherein the unique queries further do not include the given query suggestion as a substring.

9. A non-transitory computer readable storage medium storing computer instructions executable by a processor to perform a method of selecting at least one variant of a given query suggestion, including:
determining, using canonicalization rules, canonical representations of the given query suggestion and unique queries that do not include the given query suggestion as a prefix, wherein the unique queries are existing queries submitted to one or more search engines in the past;
comparing the canonical representation of the given query suggestion to the canonical representations of the unique queries to produce similarity scores between the given query suggestion and the unique queries, the similarity scores based on similarity between the canonical representation of the given query suggestion and the canonical representations of the unique queries;
selecting one or more of the unique queries having similarity scores that satisfy a threshold as candidate variants of the given query suggestion, wherein selecting the one or more of the unique queries as candidate variants includes selecting at least one unique query which has a canonical representation identical to that of the given query suggestion;

selecting one or more of the candidate variants as selected variants of the given query suggestion using query utility scores for the candidate variants, wherein a query utility score for a candidate variant is based on user response to the candidate variant during one or more prior queries; and storing data associating the given query suggestion with the selected variants for use in determining an alternative suggestion for the given query suggestion from among the selected variants.

10. The non-transitory computer readable storage medium of claim 9, wherein selecting the one or more of the candidate variants as selected variants includes selecting candidate variants having query utility scores greater than that of the given query suggestion.

11. The non-transitory computer readable storage medium of claim 9, wherein selecting the one or more of the candidate variants as selected variants includes:
sorting the candidate variants using the query utility scores to create a ranking; and
selecting the one or more unique queries as selected variants based at least in part on the ranking.

12. The non-transitory computer readable storage medium of claim 11, wherein selecting the one or more of the candidate variants as selected variants based at least in part on the ranking includes selecting a predetermined number of highest ranked candidate variants as a selected variant.

13. The non-transitory computer readable storage medium of claim 12, wherein the predetermined number is one.

14. The non-transitory computer readable storage medium of claim 9, wherein producing the similarity scores includes calculating two or more similarity scores between the given query suggestion and each of the unique queries, and selecting the one or more of the unique queries as candidate variants includes selecting a particular unique query based on a combination of the two or more similarity scores calculated between that particular unique query and the given query suggestion.

15. The non-transitory computer readable storage medium of claim 9, including sending one or more of the selected variants in response to receiving the given query suggestion.

16. The non-transitory computer readable storage medium of claim 9, wherein the unique queries further do not include the given query suggestion as a substring.

17. A system including memory and one or more processors operable to execute instructions stored in the memory, to:
determining, using canonicalization rules, canonical representations of the given query suggestion and unique queries that do not include the given query suggestion as a prefix, wherein the unique queries are existing queries submitted to one or more search engines in the past;
comparing the canonical representation of the given query suggestion to the canonical representations of the unique queries to produce similarity scores between the given query suggestion and the unique queries, the similarity scores based on similarity between the canonical representation of the given query suggestion and the canonical representations of the unique queries;
selecting one or more of the unique queries having similarity scores that satisfy a threshold as candidate variants of the given query suggestion, wherein selecting the one or more of the unique queries as candidate variants includes selecting at least one unique query which has a canonical representation identical to that of the given query suggestion;

selecting one or more of the candidate variants as selected variants of the given query suggestion using query utility scores for the candidate variants, wherein a query utility score for a candidate variant is based on user response to the candidate variant during one or more prior queries; and storing data associating the given query suggestion with the selected variants for use in determining an alternative suggestion for the given query suggestion from among the selected variants.

18. The system of claim 17, wherein selecting the one or more of the candidate variants as selected variants includes instructions to select candidate variants having query utility scores greater than that of the given query suggestion.

19. The system of claim 17, wherein selecting the one or more of the candidate variants as selected variants includes instructions to:

sort the candidate variants using the query utility scores to create a ranking; and select the one or more unique queries as selected variants based at least in part on the ranking.

20. The system of claim 19, wherein selecting the one or more of the candidate variants as selected variants based at least in part on the ranking includes instructions to select a predetermined number of highest ranked candidate variants as a selected variant.

21. The system of claim 20, wherein the predetermined number is one.

22. The system of claim 17, wherein producing the similarity scores includes instructions to calculate two or more similarity scores between the given query suggestion and each of the unique queries, and wherein selecting the one or more of the unique queries as candidate variants includes instructions to select a particular unique query based on a combination of the two or more similarity scores calculated between that particular unique query and the given query suggestion.

23. The system of claim 17, including instructions to send one or more of the selected variants in response to the given query suggestion.

24. The system of claim 17, wherein the unique queries further do not include the given query suggestion as a substring.

* * * * *